(12) United States Patent
Albrekht et al.

(10) Patent No.: US 9,207,941 B2
(45) Date of Patent: Dec. 8, 2015

(54) SYSTEMS, APPARATUSES, AND METHODS FOR REDUCING THE NUMBER OF SHORT INTEGER MULTIPLICATIONS

(71) Applicants: Ilya Albrekht, Phoenix, AZ (US); Elmoustapha Ould-Ahmed-Vall, Chandler, AZ (US)

(72) Inventors: Ilya Albrekht, Phoenix, AZ (US); Elmoustapha Ould-Ahmed-Vall, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 419 days.

(21) Appl. No.: 13/840,985

(22) Filed: Mar. 15, 2013

(65) Prior Publication Data

US 2014/0281395 A1    Sep. 18, 2014

(51) Int. Cl.
*G06F 9/30* (2006.01)
*G06F 9/00* (2006.01)

(52) U.S. Cl.
CPC .................................. *G06F 9/30145* (2013.01)

(58) Field of Classification Search
None
See application file for complete search history.

(56) References Cited

U.S. PATENT DOCUMENTS

2012/0221618 A1\* 8/2012 Feix et al. ..................... 708/524

\* cited by examiner

*Primary Examiner* — Scott Sun
(74) *Attorney, Agent, or Firm* — Nicholson De Vos Webster & Elliott LLP

(57) ABSTRACT

Systems, methods, and apparatuses for calculating a square of a data value of a first source operand, a square of a data value of a second source operand, and a multiplication of the data of the first and second operands only using one multiplication are described.

20 Claims, 15 Drawing Sheets

CONSTRUCT A TEMPORARY VARIABLE ($t=a*2^{2N}+b$), WHERE A = THE DATA VALUE OF THE FIRST SOURCE OPERAND, B = THE DATA VALUE OF THE SECOND SOURCE OPERAND, AND N = LOG2(BASE OF THE INTEGERS OF THE FIRST AND SECOND SOURCE OPERANDS) 401

↓

CALCULATE A SQUARE OF THE TEMPORARY VARIABLE TO CREATE A SECOND TEMPORARY VARIABLE ($t=t*t=a^2*2^{4N}+2ab*2^{2N}+b^2$)
403

↓

EXTRACT $A^2$, A*B, AND $B^2$ FROM THE SECOND TEMPORARY VARIABLE BY:
1) RIGHT SHIFTING THE SECOND TEMPORARY VARIABLE BY 4N TO EXTRACT $A^2$
2) ANDING THE SECOND TEMPORARY VARIABLE WITH A VALUE OF ((1 LEFT SHIFTED BY $2^N$) MINUS 1) AND THEN RIGHT SHIFTING THE ANDED RESULT BY $2^N$ PLUS 1 TO EXTRACT A*B
3) ANDING THE SECOND TEMPORARY VARIABLE WITH A ONES COMPLEMENT OF A VALUE OF ((1 LEFT SHIFTED BY N) MINUS 1) TO EXTRACT $B^2$

405

↓

STORE THE EXTRACTED VALUES 407

Figure 4

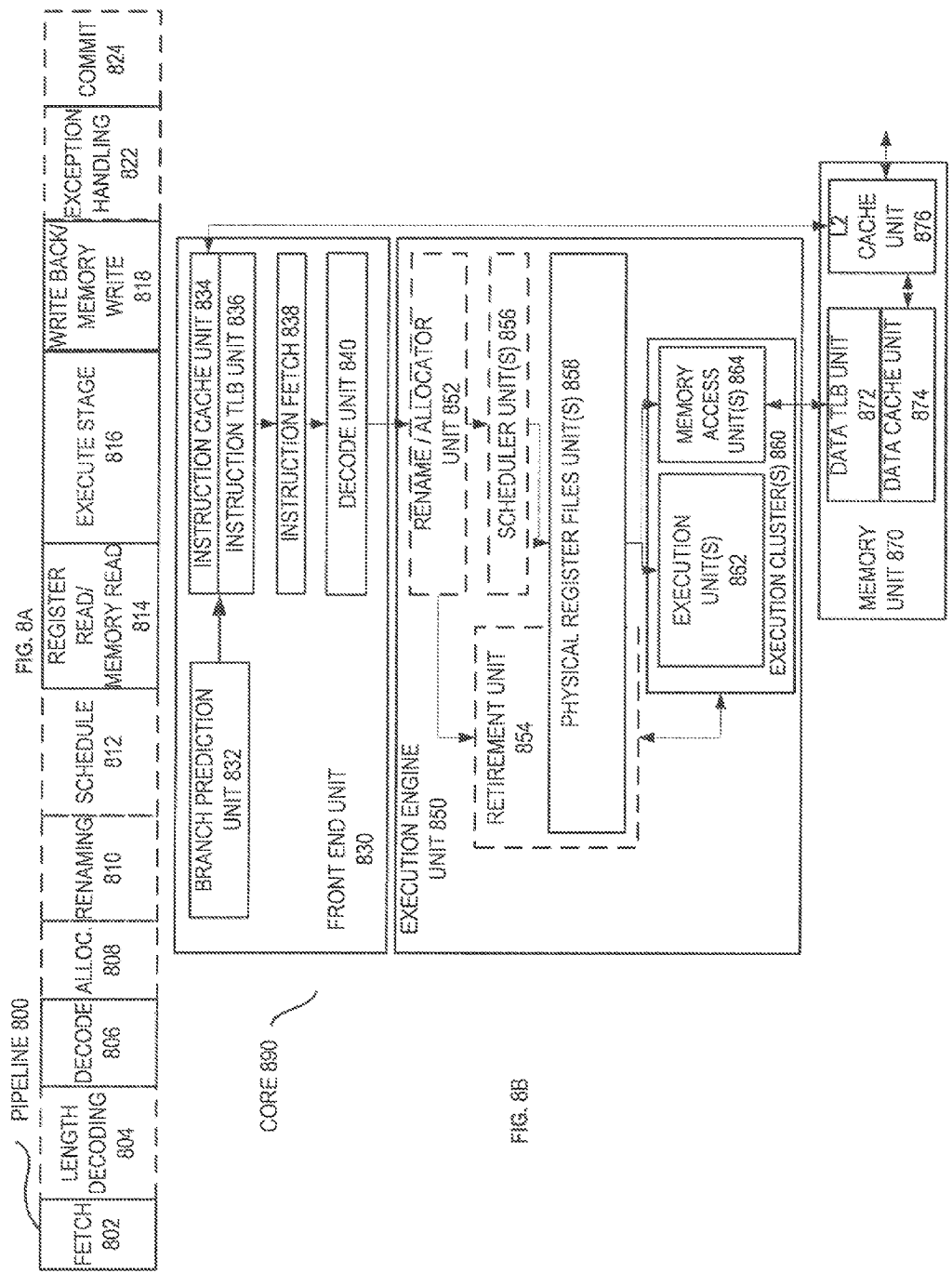

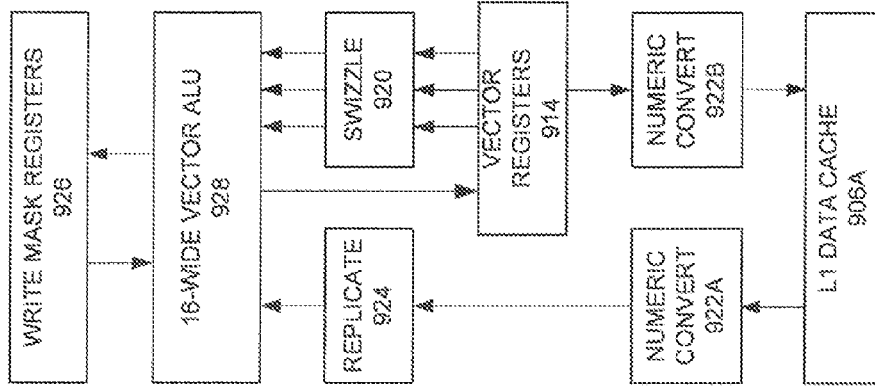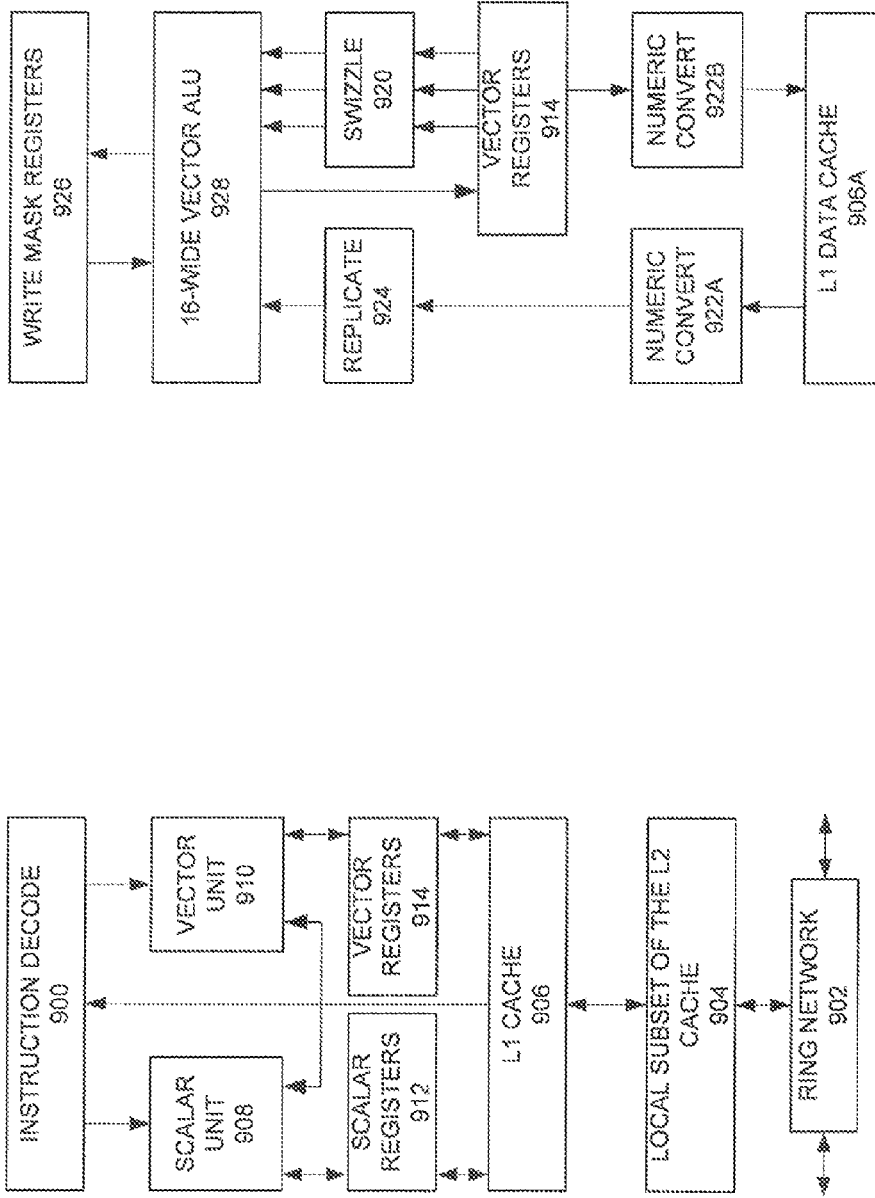

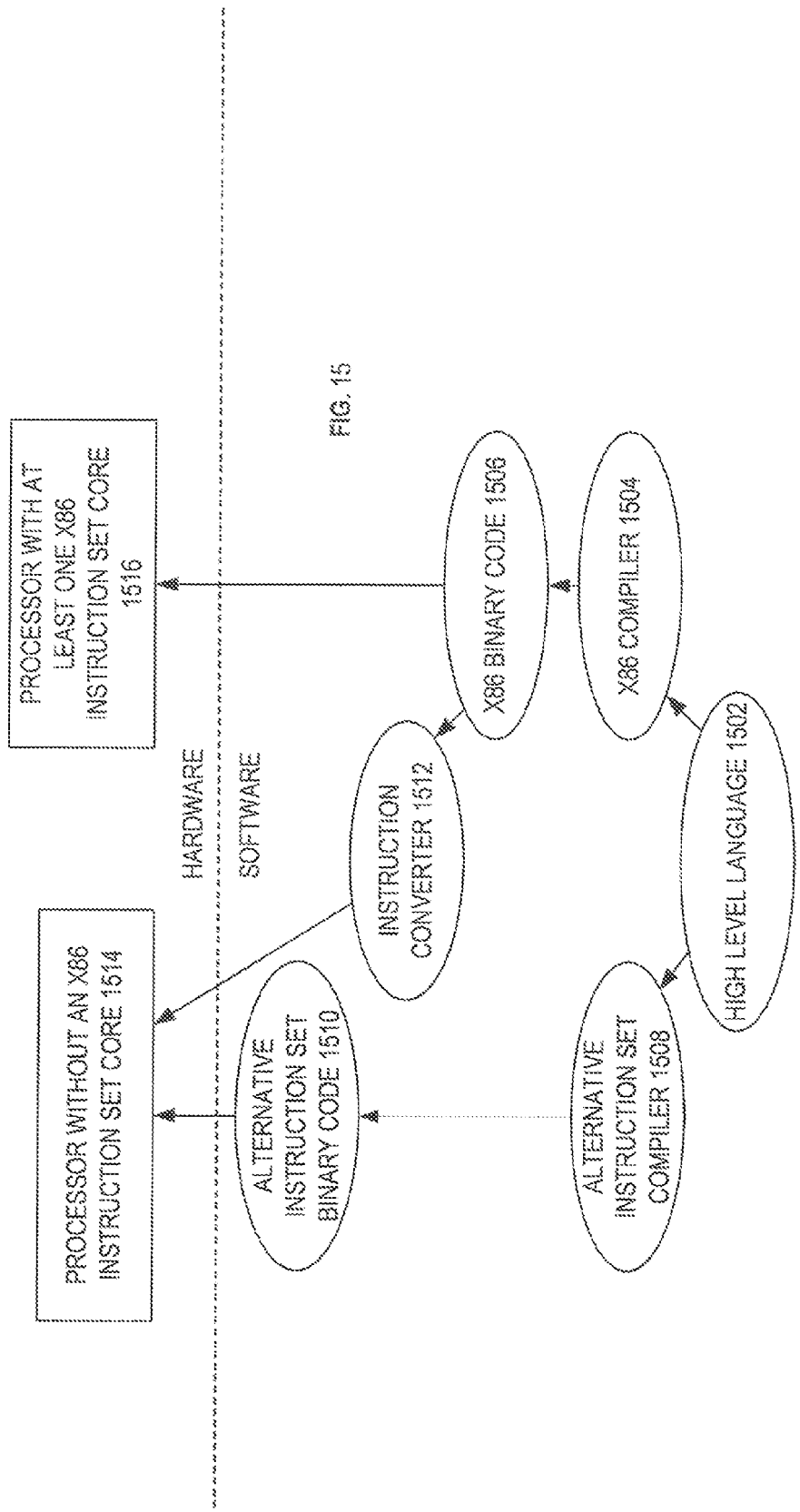

SYSTEMS, APPARATUSES, AND METHODS FOR REDUCING THE NUMBER OF SHORT INTEGER MULTIPLICATIONS

FIELD OF INVENTION

The field of invention relates generally to computer processor architecture, and, more specifically, to instructions which when executed cause a particular result.

BACKGROUND

An instruction set, or instruction set architecture (ISA), is the part of the computer architecture related to programming, and may include the native data types, instructions, register architecture, addressing modes, memory architecture, interrupt and exception handling, and external input and output (I/O). It should be noted that the term instruction generally refers herein to a macro-instruction—that is instructions that are provided to the processor for execution—as opposed to micro-instructions or micro-ops—that result from a processor's decoder decoding macro-instructions).

BRIEF DESCRIPTION OF THE DRAWINGS

The present invention is illustrated by way of example and not limitation in the figures of the accompanying drawings, in which like references indicate similar elements and in which:

FIGS. 4 and 5 illustrate embodiments of methods for processing a SQRMUL instruction.

FIG. 8A is a block diagram illustrating both an exemplary in-order pipeline and an exemplary register renaming, out-of-order issue/execution pipeline according to embodiments of the invention.

FIG. 8B is a block diagram illustrating both an exemplary embodiment of an in-order architecture core and an exemplary register renaming, out-of-order issue/execution architecture core to be included in a processor according to embodiments of the invention.

FIGS. 9A-B illustrate a block diagram of a more specific exemplary in-order core architecture, which core would be one of several logic blocks (including other cores of the same type and/or different types) in a chip.

FIG. 15 is a block diagram contrasting the use of a software instruction converter to convert binary instructions in a source instruction set to binary instructions in a target instruction set according to embodiments of the invention.

DETAILED DESCRIPTION

Figure 1:
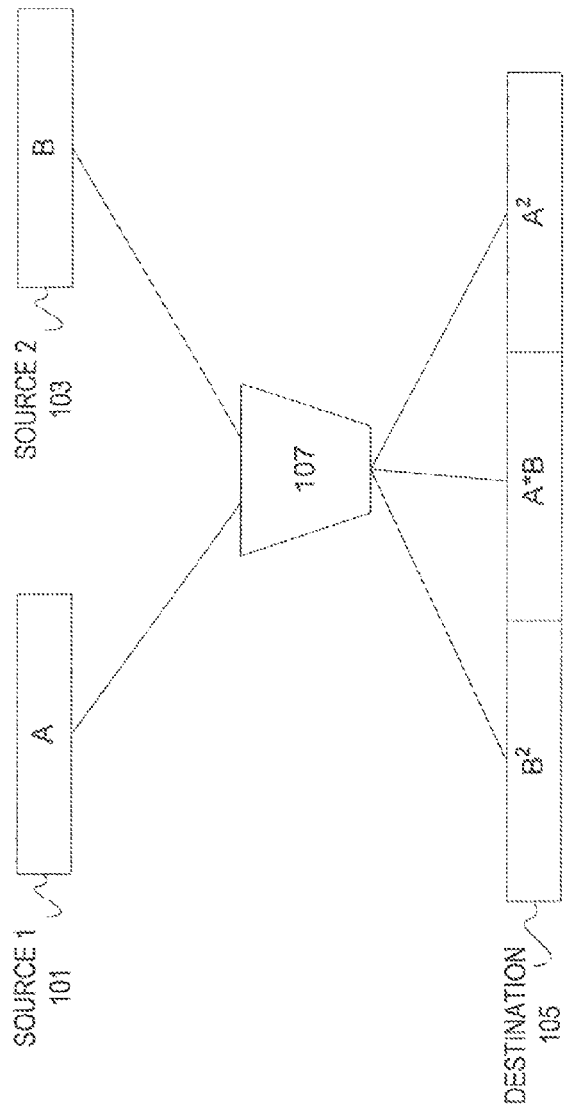
FIG. 1 illustrates an exemplary execution of the SQRMUL instruction.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Overview

The instruction set architecture is distinguished from the microarchitecture, which is the internal design of the processor implementing the ISA. Processors with different microarchitectures can share a common instruction set. For example, Intel Pentium 4 processors, Intel Core processors, and Advanced Micro Devices, Inc. of Sunnyvale Calif. processors implement nearly identical versions of the x86 instruction set (with some extensions having been added to newer versions), but have different internal designs. For example, the same register architecture of the ISA may be implemented in different ways in different micro-architectures using well known techniques, including dedicated physical registers, one or more dynamically allocated physical registers using a register renaming mechanism (e.g., the use of a Register Alias Table (RAT), a Reorder Buffer (ROB) and a retirement register file as described in U.S. Pat. No. 5,446,912; the use of multiple maps and a pool of registers as described in U.S. Pat. No. 5,207,132), etc. Unless otherwise specified, the phrases register architecture, register file, and register refer to that which is visible to the software/programmer and the manner in which instructions specify registers. Where specificity is desired, the adjective logical, architectural, or software visible will be used to indicate registers/files in the register architecture, while different adjectives will be used to designate registers in a given micro-architecture (e.g., physical register, reorder buffer, retirement register, register pool).

An instruction set includes one or more instruction formats. A given instruction format defines various fields (number of bits, location of bits) to specify, among other things, the operation to be performed and the operand(s) on which that operation is to be performed. A given instruction is expressed using a given instruction format and specifies the operation and the operands. An instruction stream is a specific sequence of instructions, where each instruction in the sequence is an occurrence of an instruction in an instruction format.

Scientific, financial, auto-vectorized general purpose, RMS (recognition, mining, and synthesis)/visual and multimedia applications (e.g., 2D/3D graphics, image processing, video compression/decompression, voice recognition algorithms and audio manipulation) often require the same operation to be performed on a large number of data items (referred to as "data parallelism"). Single Instruction Multiple Data (SIMD) refers to a type of instruction that causes a processor to perform the same operation on multiple data items. SIMD technology is especially suited to processors that can logically divide the bits in a register into a number of fixed-sized data elements, each of which represents a separate value. For example, the bits in a 64-bit register may be specified as a source operand to be operated on as four separate 16-bit data elements, each of which represents a separate 16-bit value. As another example, the bits in a 256-bit register may be specified as a source operand to be operated on as four separate 64-bit packed data elements (quad-word (Q) size data elements), eight separate 32-bit packed data elements (double word (D) size data elements), sixteen separate 16-bit packed data elements (word (W) size data elements), or thirty-two separate 8-bit data elements (byte (B) size data elements). This type of data is referred to as the packed data type or vector data type, and operands of this data type are referred to as packed data operands or vector operands. In other words, a packed data item or vector refers to a sequence of packed data elements; and a packed data operand or a vector operand is a source or destination operand of a SIMD instruction (also known as a packed data instruction or a vector instruction).

By way of example, one type of SIMD instruction specifies a single vector operation to be performed on two source vector operands in a vertical fashion to generate a destination vector operand (also referred to as a result vector operand) of the same size, with the same number of data elements, and in the same data element order. The data elements in the source vector operands are referred to as source data elements, while the data elements in the destination vector operand are referred to a destination or result data elements. These source vector operands are of the same size and contain data elements of the same width, and thus they contain the same number of data elements. The source data elements in the same bit positions in the two source vector operands form pairs of data elements (also referred to as corresponding data elements; that is, the data element in data element position 0 of each source operand correspond, the data element in data element position 1 of each source operand correspond, and so on). The operation specified by that SIMD instruction is performed separately on each of these pairs of source data elements to generate a matching number of result data elements, and thus each pair of source data elements has a corresponding result data element. Since the operation is vertical and since the result vector operand is the same size, has the same number of data elements, and the result data elements are stored in the same data element order as the source vector operands, the result data elements are in the same bit positions of the result vector operand as their corresponding pair of source data elements in the source vector operands. In addition to this exemplary type of SIMD instruction, there are a variety of other types of SIMD instructions (e.g., that have only one or has more than two source vector operands; that operate in a horizontal fashion; that generate a result vector operand that is of a different size, that have a different size of data elements, and/or that have a different data element order). It should be understood that the term destination vector operand (or destination operand) is defined as the direct result of performing the operation specified by an instruction, including the storage of that destination operand at a location (be it a register or at a memory address specified by that instruction) so that it may be accessed as a source operand by another instruction (by specification of that same location by the another instruction.

The SIMD technology, such as that employed by the Intel® Core™ processors having an instruction set including x86, MMX™, Streaming SIMD Extensions (SSE), SSE2, SSE3, SSE4.1, and SSE4.2 instructions, has enabled a significant improvement in application performance (Core™ and MMX™ are registered trademarks or trademarks of Intel Corporation of Santa Clara, Calif.). An additional set of SIMD extensions, referred to the Advanced Vector Extensions (AVX) (AVX1 and AVX2) and using the VEX coding scheme, has been released and/or published (e.g., see Intel® 64 and IA-32 Architectures Software Developers Manual, October 2011; and see Intel® Advanced Vector Extensions Programming Reference, June 2011).

Some regular mathematic operations like calculating $a^2+a*b+b^2$ and $a[i]=b[i]^2$ are quite frequent for matrix and long number multiplications. Such mathematic operations use a lot of multiplication instructions which are still quite expensive in terms of latency on the modern CPUs. For example, let a, b be unsigned integers in base B. The code for calculating $a^2+a*b+b^2$ is 1: a_sq=a*a;
2: a_times_b=a*b;
3: b_sq=b*b;
4: additions of the three multiplications For modern CPUs each multiplication takes ~5 cycles, so the total latency for 3 multiplications will be 15 cycles.

Below are embodiments of an instruction generically called square-multiply (SQRMUL) instruction of the instruction set and embodiments of systems, architectures, instruction formats, etc. that may be used to improve this latency. The execution of a SQRMUL calculates a square of a data value of a first source operand, a square of a data value of a second source operand, and a multiplication of the data of the first and second operands and stores all three calculations in a single destination operand.

FIG. 1 illustrates an exemplary execution of the SQRMUL instruction. Two source registers 101 and 103 hold values A and B respectively. These values are processed by execution logic 107 to produce $A^2$, $A*B$, and $B^2$. These results are stored in a destination register 105. This register may be general-purpose register (e.g., a doubleword sized register) or a packed-data register (with data element positions dedicated to storing the calculated values). While a particular order is illustrated, any other order may be used for storing the calculated values.

Figure 2:
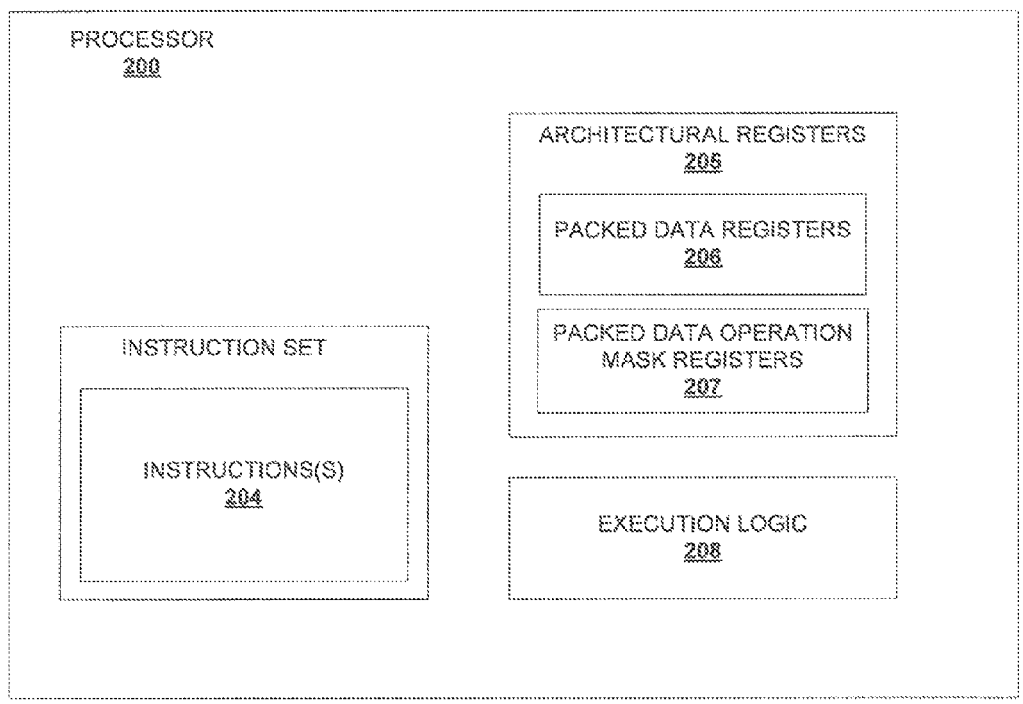
FIG. 2 is a block diagram of an exemplary embodiment of a processor (processor core) to execute one or more instructions.

FIG. 2 is a block diagram of an exemplary embodiment of a processor (processor core) 200 to execute one or more SQRMUL instructions 204. In some embodiments, the processor may be a general-purpose processor (e.g., of the type used in desktop, laptop, servers, and like computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers, to name just a few examples. The processor may be any of various complex instruction set computing (CISC) processors, various reduced instruction set computing (RISC) processors, various very long instruction word (VLIW) processors, various hybrids thereof, or other types of processors entirely.

The processor 200 includes architecturally-visible registers (e.g., an architectural register file) 205. The architectural registers may also be referred to herein simply as registers. Unless otherwise specified or apparent, the phrases architectural register, register file, and register are used herein to refer to registers that are visible to the software and/or programmer and/or the registers that are specified by macroinstructions or assembly language instructions to identify operands. These registers are contrasted to other non-architectural or non-architecturally visible registers in a given microarchitecture (e.g., temporary registers used by instructions, reorder buffers, retirement registers, etc.). The registers generally represent on-die processor storage locations. The illustrated architectural registers include packed data registers 206. Each of the packed data registers may be operable to store packed or vector data. The illustrated architectural registers may also include packed data operation mask registers 207. Each of the packed data operation mask registers may be operable to store a packed data operation mask. These registers may be referred to as writemask registers in this description. Packed data operands may be stored in the packed data registers 207.

The processor also includes execution logic 208. The execution logic is operable to execute or process the one or more SQRMUL instructions 204. In some embodiments, the execution logic may include particular logic (e.g., particular circuitry or hardware potentially combined with firmware) to execute these instructions.

Exemplary Format of SQRMUL

An exemplary format of this instruction is "SQRMUL DEST, SOURCE 1, SOURCE 2" where the all of the operands are registers. In some embodiments, the registers are general-purpose registers. These registers may be of any size including, but not limited to, 8-, 16-, 32-, 64-, and 128-bit. In other embodiments, the registers are floating-point or packed data registers. In other embodiments, the sources are general-purpose registers and the destination is a packed data register. The source registers store unsigned integers in most embodiments.

Exemplary Methods of Execution of SQRMUL

Figure 3:
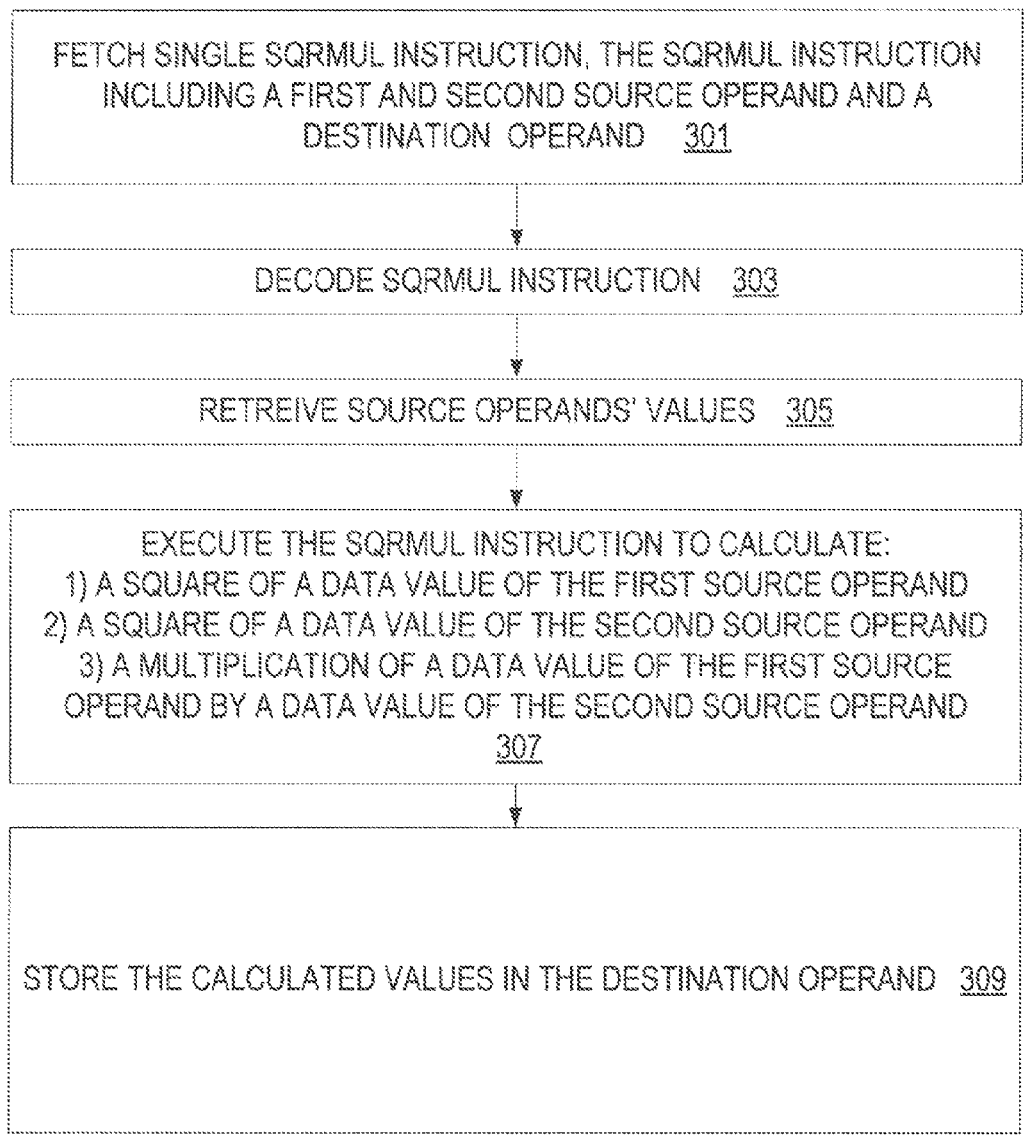
FIG. 3 illustrates an embodiment of the execution of a SQRMUL instruction in a processor.

FIG. 3 illustrates an embodiment of the execution of a SQRMUL instruction in a processor. A SQRMUL instruction with a first and second source register operand, a destination register operand, and an opcode is fetched at 301.

The SQRMUL instruction is decoded by decoding logic at 303.

The source operands' values are retrieved/read at 305. For example, the source registers are read.

The decoded SQRMUL instruction (or operations comprising such an instruction such as microoperations) is executed by execution resources such as one or more functional units at 307 to calculate a square of a data value of a first source operand, a square of a data value of a second source operand, and a multiplication of the data of the first and second operands and stores all three calculations in a single destination operand The calculated values are stored into the destination register operand at 309. These values may be stored in a particular order such as from least significant to most significant ($A^2$, $A*B$, to $B^2$) or the opposite of that, etc. In some embodiments, the calculated values are stored in data elements of a packed data register.

While 307 and 309 have been illustrated separately, in some embodiments they are performed together as a part of the execution of the instruction.

Figure 5:
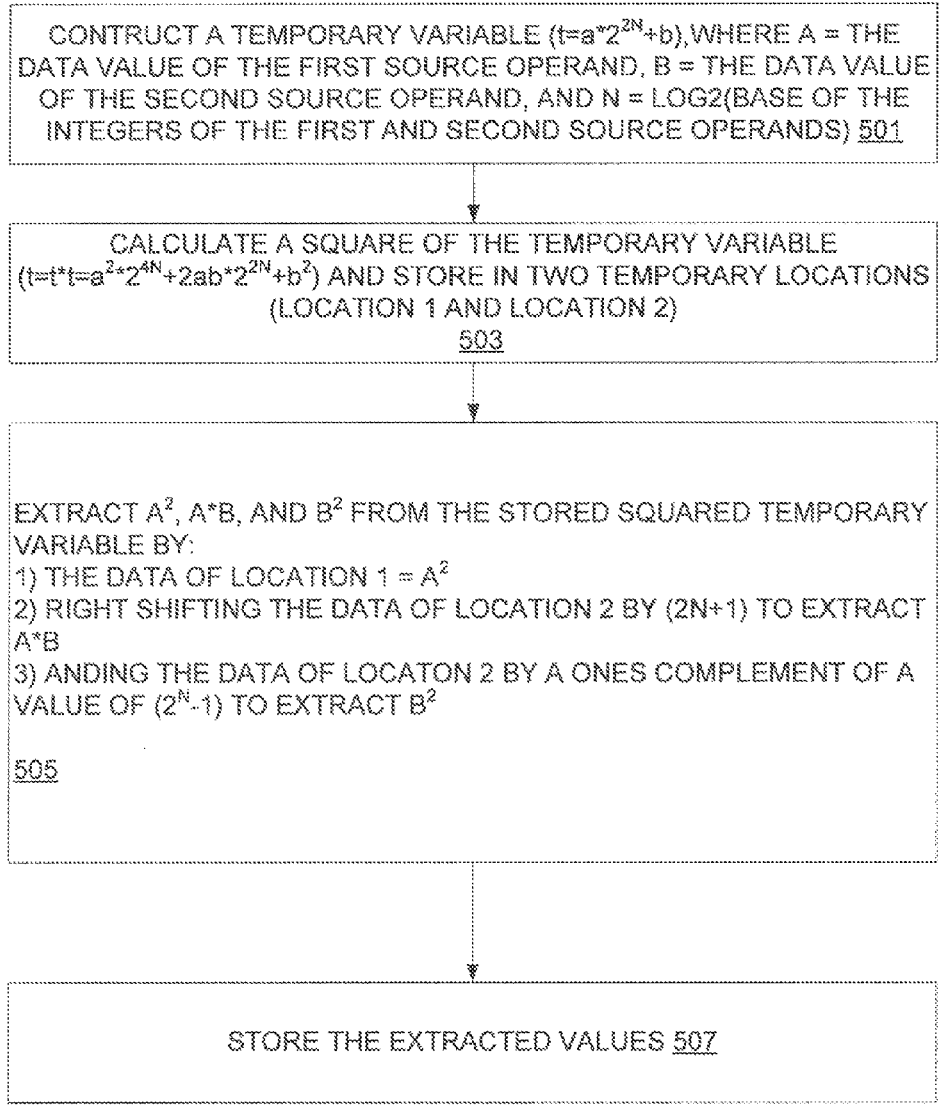

FIGS. 4 and 5 illustrate embodiments of methods for processing a SQRMUL instruction. In these embodiments, L is defined as a general-purpose register size in bits (32 or 64), and a and b are unsigned integers of the first and second operands respectively in base B with N equal to $\log_2(B)$ in bits. In the examples below, a or A represents that data stored in the first source and b or B represents the data stored in the second source. Shifting, etc. is done by number of bits in some embodiments.

FIG. 4 illustrates an embodiment of a method for processing a SQRMUL instruction. This is a general case where L>=6N. In this embodiment it is assumed that some, if not all, of the operations 301-305 have been performed earlier, however, they are not shown in order to not obscure the details presented below. For example, the fetching and decoding are not shown, nor is the operand retrieval shown.

At 401, a temporary variable t is constructed. In some embodiments, this temporary variable is constructed by left shifting A by 2N and then ORing that shifted value by B. In other words, t=(A<<2*N)|B. Typically this takes two clock cycles. The resulting value of t is $A*2^{2N}+B$.

The square of the temporary variable is calculated at 403. This creates a second temporary variable of $t=t*t=A^2*2^{4N}+2AB*2^{2N}+B^2$. In some instances, this multiplication takes 5 cycles.

$A^2$, $A*B$, and $B^2$ are extracted from the second temporary variable at 405. $A^2$ is extracted by right shifting the second temporary variable by 4N. In other words, $A^2$=t>>4N. $A*B$ is extracted by ANDing the second temporary variable with a value of ((1 left shifted by $2^N$) minus 1, and then right shifting by 2N plus 1. In other words, $A*B$=(t&(1<<$2^N$−1))>>(2N+1). Finally, $B^2$ is extracted by ANDing the second temporary variable with a ones complement of a value of ((2 left shifted by N) minus 1). In other words, $B^2$=t&~(2<<N−1). In some systems this takes 2-3 cycles in total.

The extracted values are stored at 407. In some embodiments, $A^2$, $A*B$, and $B^2$ are stored in the lower, middle, and upper quadrants of a doubleword respectively. In other embodiments, these values are stored in separate data elements of a packed data register.

FIG. 5 illustrates an embodiment of a method for processing a SQRMUL instruction. This is a general case where 4N=L. In this embodiment it is assumed that some, if not all, of the operations 301-305 have been performed earlier, however, they are not shown in order to not obscure the details presented below. For example, the fetching and decoding are not shown, nor is the operand retrieval shown.

At 501, a temporary variable t is constructed. In some embodiments, this temporary variable is constructed by left shifting A by 2N and then ORing that shifted value by B. In other words, t=(A<<2*N)|B. Typically this takes two clock cycles. The resulting value of t is $A*2^{2N}+B$.

The square of the temporary variable is calculated and stored in a first and second location at 503. This creates locations that store $A^2*2^{4N}+2AB*2^{2N}+B^2$. In some instances, this multiplication takes 5 cycles. In some embodiments, the first and second locations are registers.

$A^2$, $A*B$, and $B^2$ are extracted at 505. $A^2$ is the value stored in the first location. In other words, $A^2$=location 1. $A*B$ is extracted by right shifting the data stored in the second location by (2N plus 1). In other words, $A*B$=location 2>>(2N+1). Finally, $B^2$ is extracted by ANDing the contents of the second location with a ones complement of a value of ($2^{2N}$ minus 1). In other words, $B^2$=location 2&~(2<<$2^N$−1). In some systems this takes 1 cycle in total.

The extracted values are stored at 507. In some embodiments, $A^2$, $A*B$, and $B^2$ are stored in the lower, middle, and upper quadrants of a doubleword respectively. In other embodiments, these values are stored in separate data elements of a packed data register.

Figure 6:
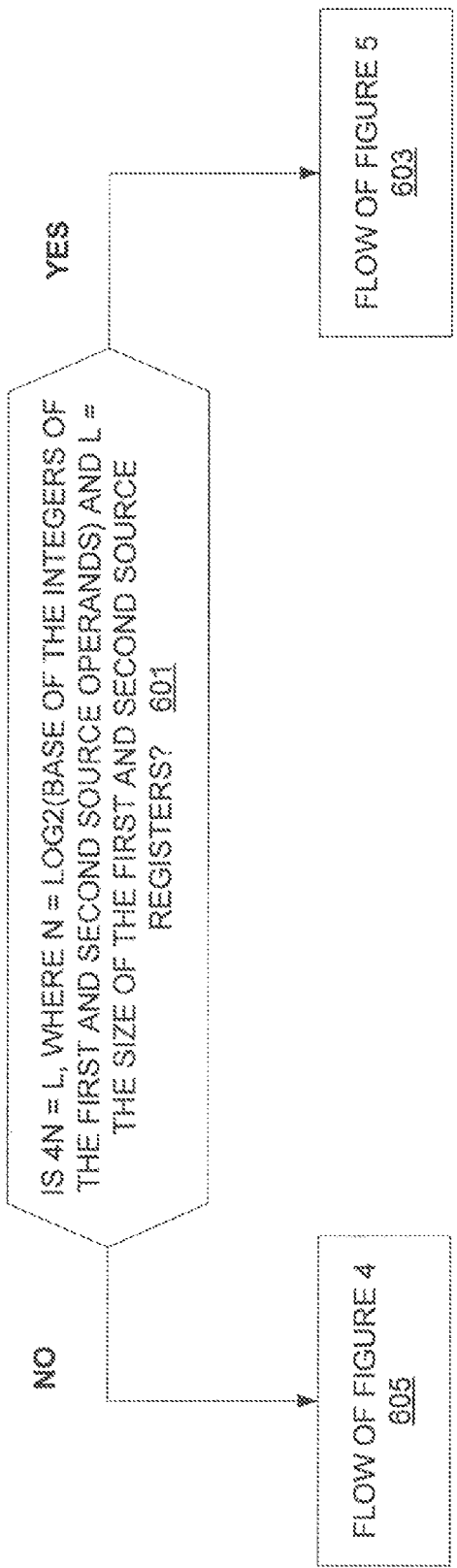
FIG. 6 illustrates an exemplary method of selecting between the flows of FIGS. 4 and 5.

FIG. 6 illustrates an exemplary method of selecting between the flows of FIGS. 4 and 5. At 601, a determination of if 4N=L is made. If yes, then at 603 FIG. 5's flow is used. If no, then at 605 FIG. 4's flow is used.

While the above has been described with respect to a SQRMUL instruction, the code sequences above may be performed by multiple instructions in processors that do not support SQRMUL.

Exemplary Register Architecture

Figure 7:
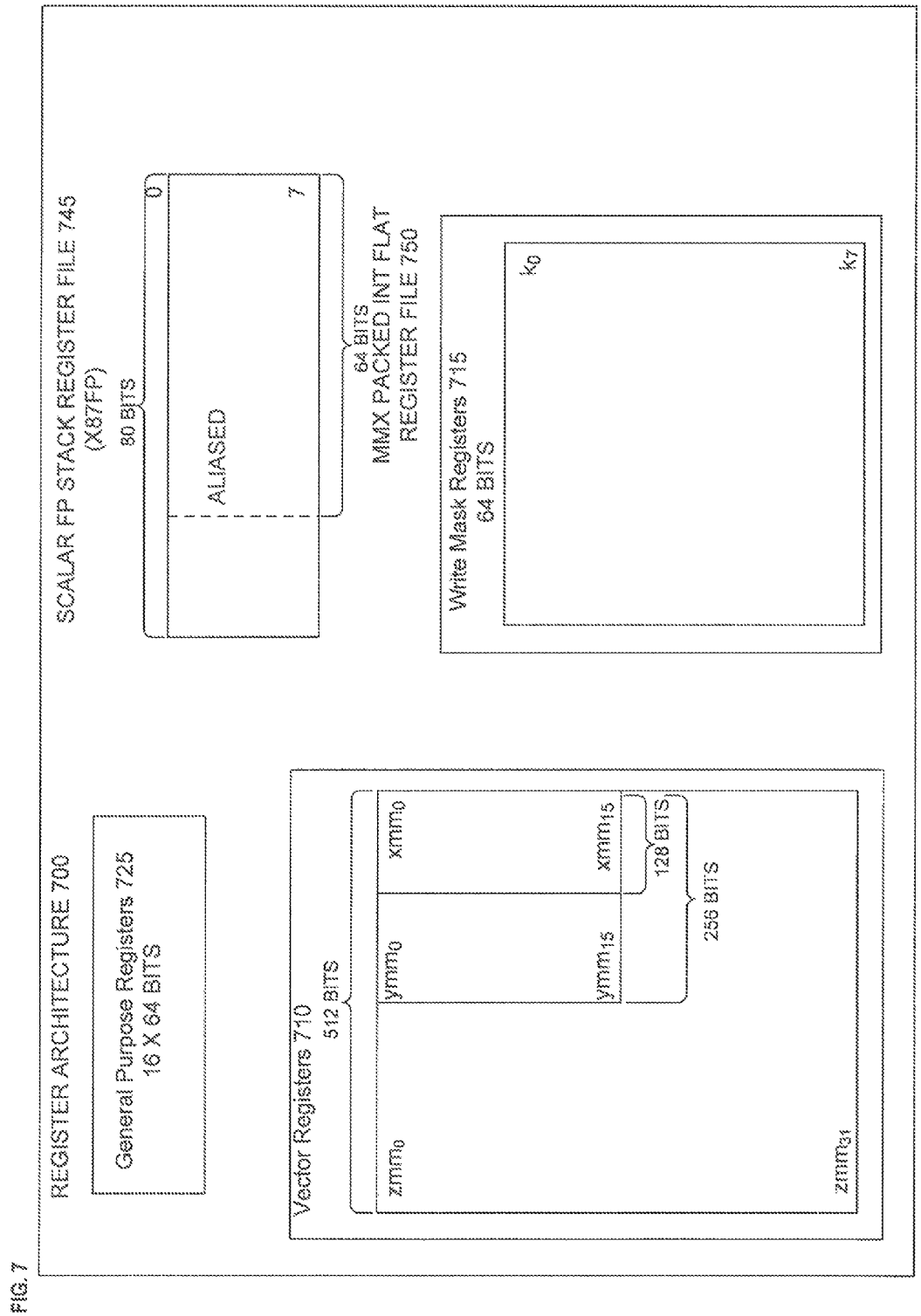
FIG. 7 is a block diagram of a register architecture 700 according to one embodiment of the invention.

FIG. 7 is a block diagram of a register architecture 700 according to one embodiment of the invention. In the embodiment illustrated, there are 32 vector registers 710 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

General-purpose registers 725—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 745, on which is aliased the MMX packed integer flat register file 750—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file(s) unit(s) 858. Each of the physical register file(s) units 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 858 comprises a vector registers unit and a scalar registers unit. These register units may provide architectural vector registers, vector mask registers, and general purpose registers. The physical register file(s) unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file(s) unit(s) 858 are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file(s) unit(s) 858, and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file(s) unit(s) 858 and the memory unit 870 perform the register read/memory read stage 814; the execution cluster 860 perform the execute stage 816; 6) the memory unit 870 and the physical register file(s) unit(s) 858 perform the write back/memory write stage 818; 7) various units may be involved in the exception handling stage 822; and 8) the retirement unit 854 and the physical register file(s) unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2, and/or some form of the generic vector friendly instruction format (U=0 and/or U=1) previously described), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input.

Processor with Integrated Memory Controller and Graphics

Figure 10:
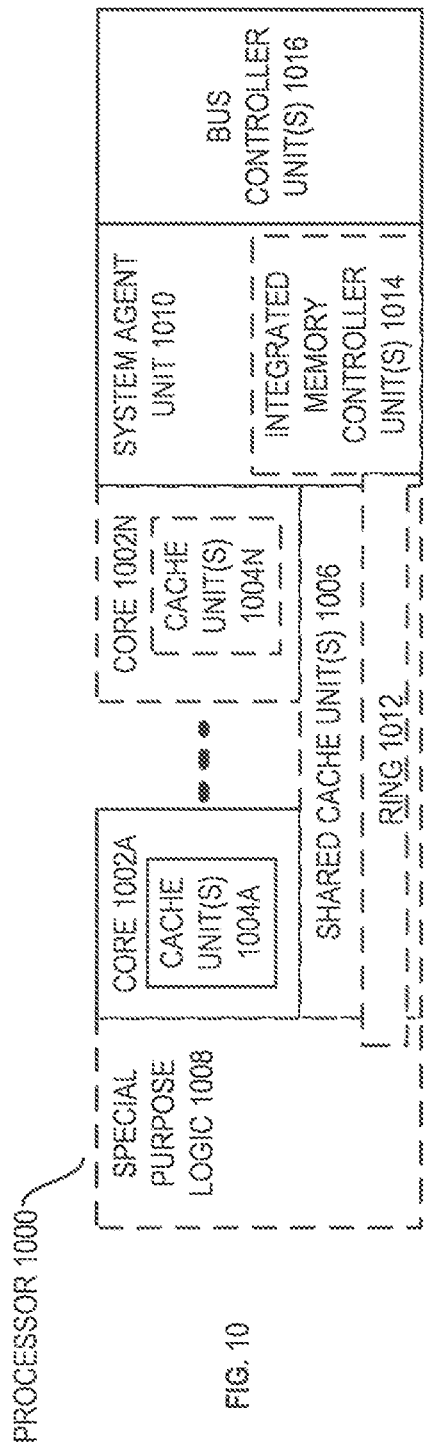
FIG. 10 is a block diagram of a processor 1000 that may have more than one core, may have an integrated memory controller, and may have integrated graphics according to embodiments of the invention.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
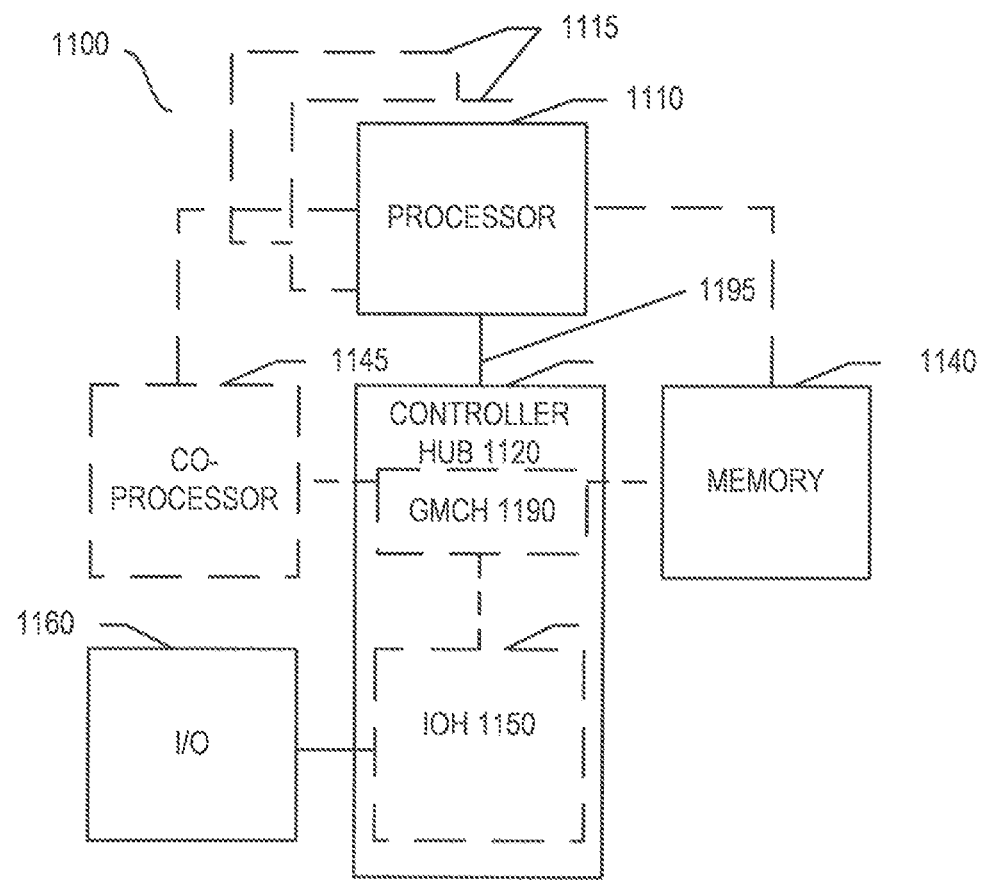
FIGS. 11-14 are block diagrams of exemplary computer architectures.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
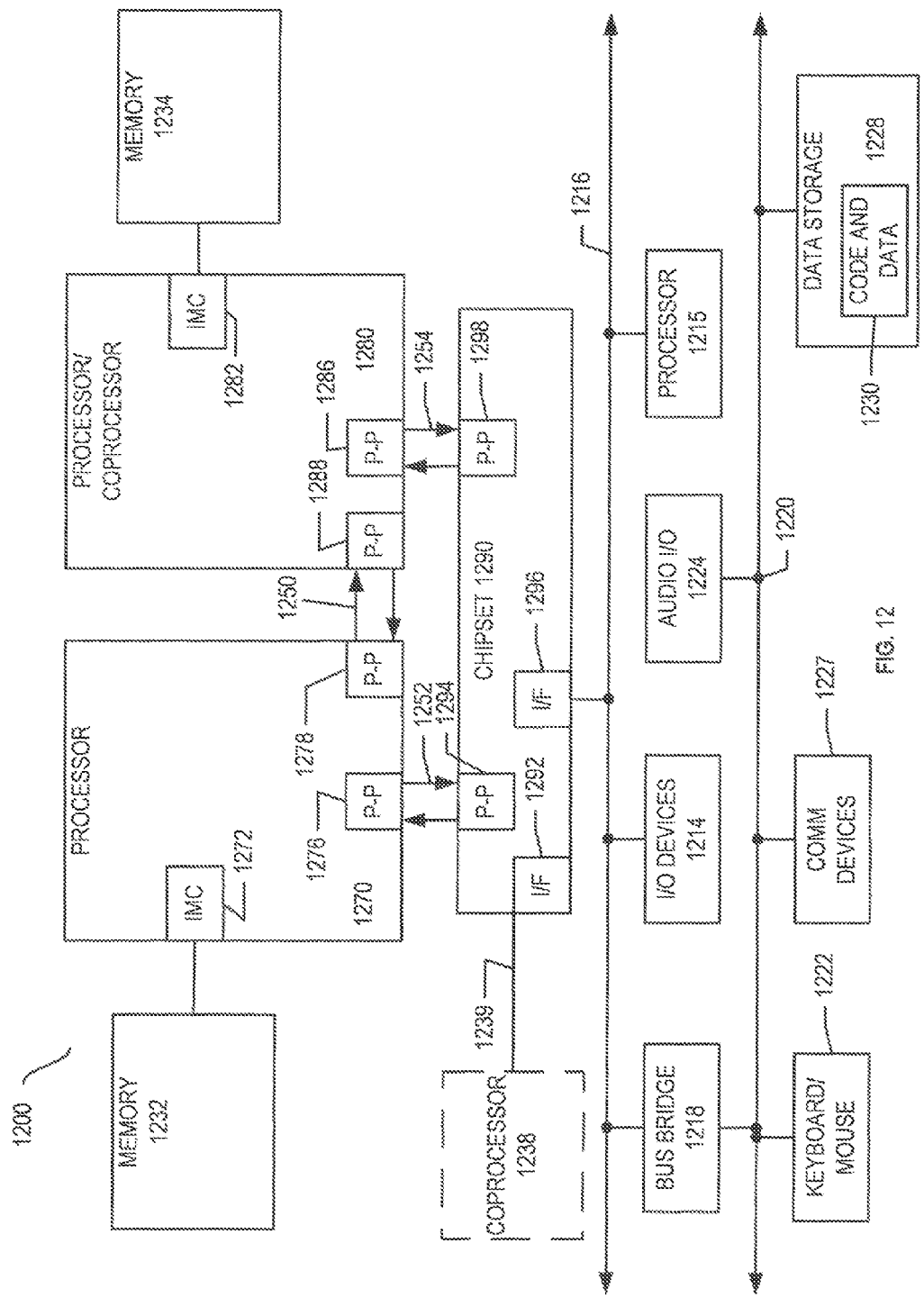

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288.

Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
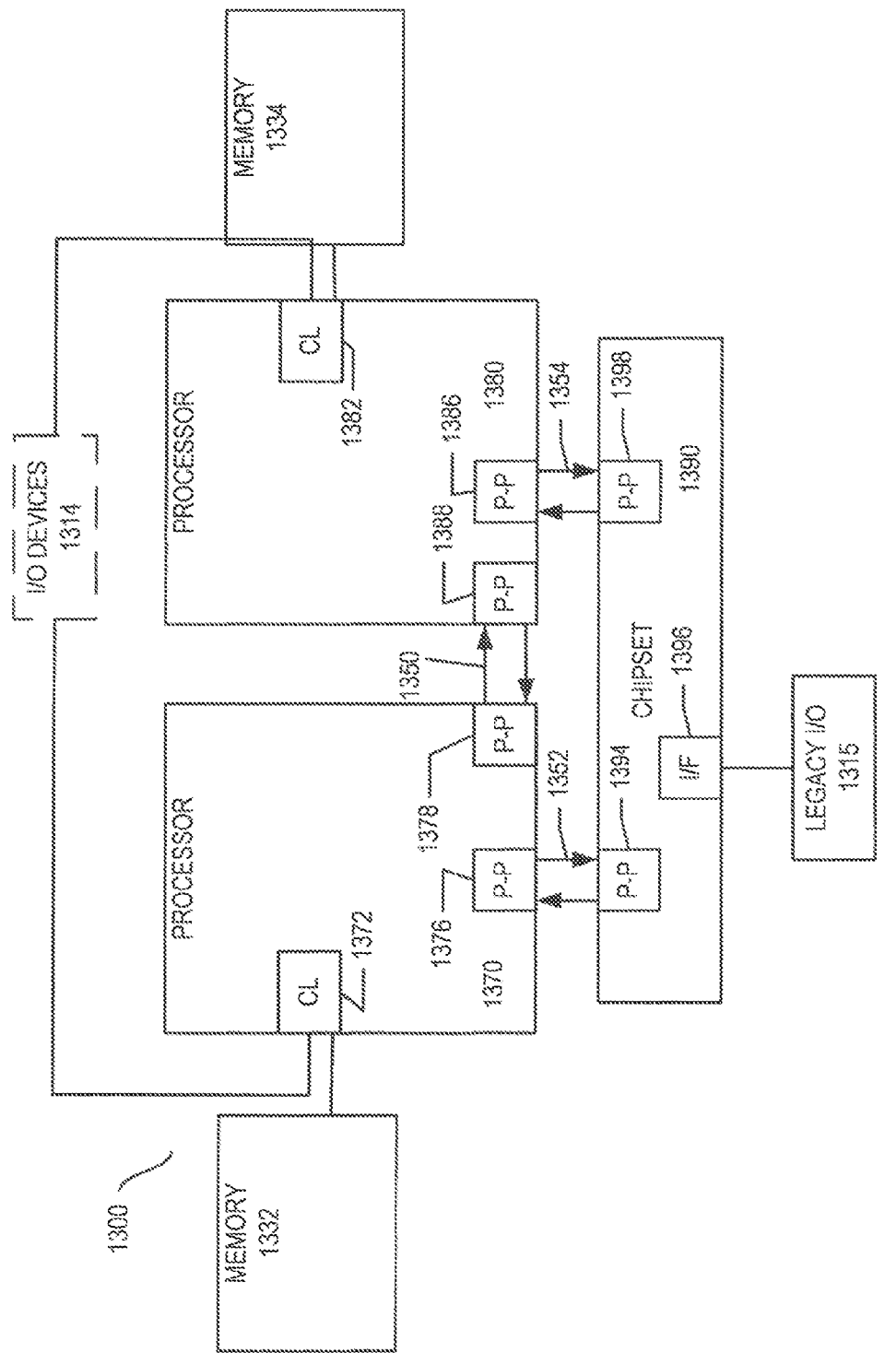

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1272 and 1282, respectively. Thus, the CL 1272, 1282 include integrated memory controller units and include I/O control logic. FIG. 13 illustrates that not only are the memories 1232, 1234 coupled to the CL 1272, 1282, but also that I/O devices 1314 are also coupled to the control logic 1272, 1282. Legacy I/O devices 1315 are coupled to the chipset 1290.

Figure 14:
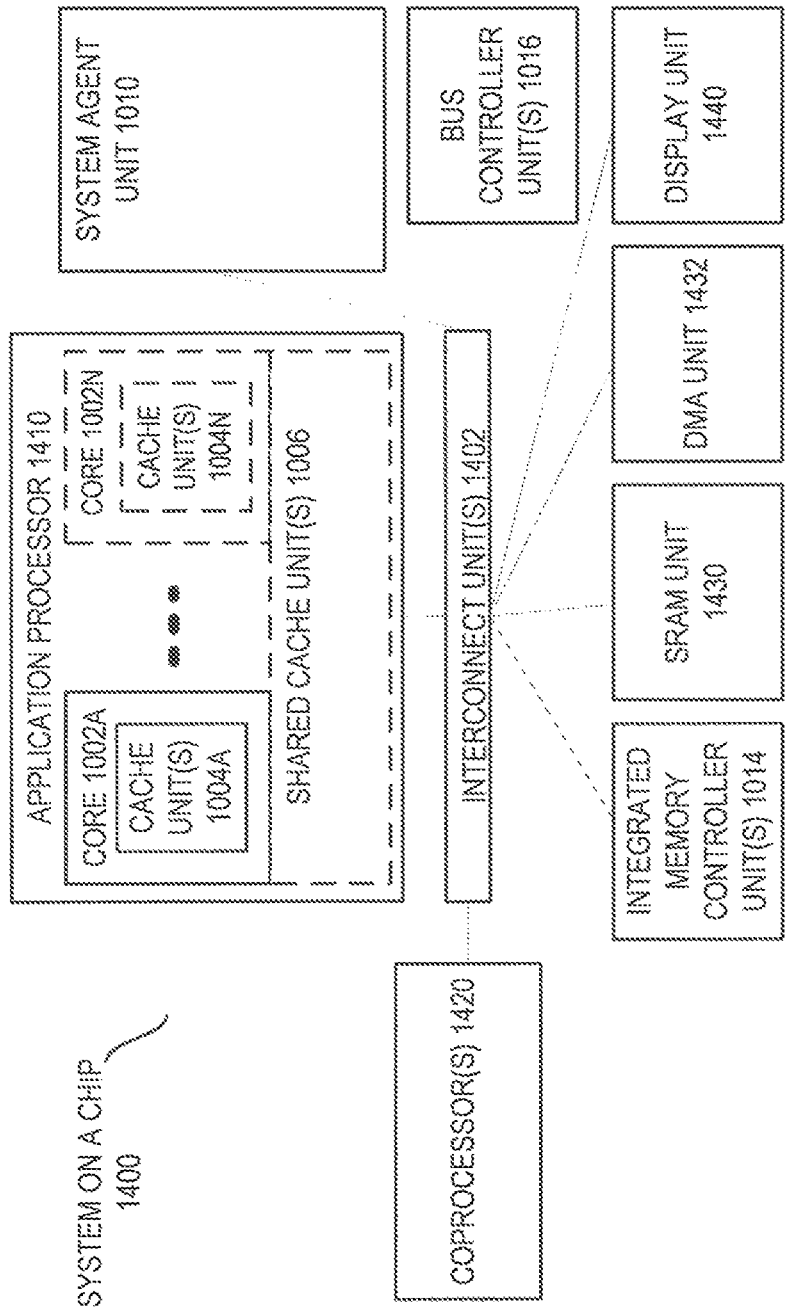

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 202A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Embodiments of the invention include an apparatus comprising decode logic to decode square-multiply (SQRMUL) instruction, the SQRMUL instruction including a first source operand, a second source operand, and a destination operand, execution logic to: calculate a square of a data value of a first source operand, calculate a square of a data value of a second source operand, calculate a multiplication of the data of the first and second operands, wherein the calculations only use one multiplication operation, and store the results in the destination operand.

In some embodiments of the apparatus, one or more of the following are implemented either in conjunction with each other or individually: i) the destination operand is a general-purpose register; ii) the square of a data value of a first source operand is stored in lower order bits of the destination operand, the square of a data value of a second source operand is stored in higher order bits of the destination operand, and the multiplication of the data of the first and second operands is stored in middle order bits of the destination operand; iii) the destination operand is a packed data register and each of the three calculations is stored in a different data element of the packed data register; iv) the execution logic to calculate the square of the data value of the first source operand by, generating a temporary variable by left shifting the data value of the first source operand by 2N and ORing that shifted value by the data value of the second source operand, squaring the temporary variable, and right shifting the temporary variable by 4N bits, wherein N is $\log_2$(base of the data value); v) the execution logic to calculate the multiplication of the data value of the first source and second source operand by, generating a temporary variable by left shifting the data value of the first source operand by 2N and ORing that shifted value by the data value of the second source operand, squaring the temporary variable, ANDing the squared temporary variable with a value of ((2 left shifted by $2^N$) minus 1, and right shifting by 2N plus 1, wherein N is $\log_2$(base of the data value); vi) the execution logic to calculate the square of the data value of the second source operand by, generating a temporary variable by left shifting the data value of the first source operand by 2N and ORing that shifted value by the data value of the second source operand, squaring the temporary variable, ANDing the squared temporary variable with a ones complement of a value of ((1 left shifted by N) minus 1), wherein N is $\log_2$(base of the data value).

Embodiments of the invention include a method of performing in a computer processor a square-multiply (SQRMUL) instruction, the SQRMUL instruction including a first source operand, a second source operand, and a destination operand, the method comprising: calculating a square of a data value of a first source operand, calculating a square of a data value of a second source operand, calculating a multiplication of the data of the first and second operands, wherein the calculations only use one multiplication operation; and storing the results in the destination operand.

In some embodiments of the method, one or more of the following are implemented either in conjunction with each other or individually: i) the destination operand is a general-purpose register; ii) the square of a data value of a first source operand is stored in lower order bits of the destination operand, the square of a data value of a second source operand is stored in higher order bits of the destination operand, and the multiplication of the data of the first and second operands is stored in middle order bits of the destination operand; iii) the destination operand is a packed data register and each of the three calculations is stored in a different data element of the packed data register; iv) the square of the data value of the first source operand by, generating a temporary variable is calculated by left shifting the data value of the first source operand by 2N and ORing that shifted value by the data value of the second source operand, squaring the temporary variable, and right shifting the temporary variable by 4N bits, wherein N is $\log_2$(base of the data value); v) the multiplication of the data value of the first source and second source operand is calculated by, generating a temporary variable by left shifting the data value of the first source operand by 2N and ORing that shifted value by the data value of the second source operand, squaring the temporary variable, ANDing the squared temporary variable with a value of ((2 left shifted by $2^N$) minus 1, and right shifting by 2N plus 1, wherein N is $\log_2$(base of the data value); vi) the square of the data value of the second source operand is calculated by, generating a temporary variable by left shifting the data value of the first source operand by 2N and ORing that shifted value by the data value of the second source operand, squaring the temporary variable, ANDing the squared temporary variable with a ones complement of a value of ((1 left shifted by N) minus 1), wherein N is $\log_2$(base of the data value).

Embodiments of the invention include a tangible machine-readable medium including code which when executed by a processor causes the processor to execute a method to perform a square-multiply (SQRMUL) instruction, the SQRMUL instruction including a first source operand, a second source operand, and a destination operand, the method comprising: calculating a square of a data value of a first source operand, calculating a square of a data value of a second source operand, calculating a multiplication of the data of the first and second operands, wherein the calculations only use one multiplication operation; and storing the results in the destination operand.

In some embodiments of the tangible machine-readable medium, one or more of the following are implemented either in conjunction with each other or individually: i) the destination operand is a general-purpose register; ii) the square of a data value of a first source operand is stored in lower order bits of the destination operand, the square of a data value of a second source operand is stored in higher order bits of the destination operand, and the multiplication of the data of the first and second operands is stored in middle order bits of the destination operand; iii) the destination operand is a packed data register and each of the three calculations is stored in a different data element of the packed data register; iv) the square of the data value of the first source operand by, generating a temporary variable is calculated by left shifting the data value of the first source operand by 2N and ORing that shifted value by the data value of the second source operand, squaring the temporary variable, and right shifting the temporary variable by 4N bits, wherein N is $\log_2$(base of the data value); v) the multiplication of the data value of the first source and second source operand is calculated by, generating a temporary variable by left shifting the data value of the first source operand by 2N and ORing that shifted value by the data value of the second source operand, squaring the temporary variable, ANDing the squared temporary variable with a value of ((2 left shifted by $2^N$) minus 1, and right shifting by 2N plus 1, wherein N is $\log_2$(base of the data value); vi) the square of the data value of the second source operand is calculated by, generating a temporary variable by left shifting the data value of the first source operand by 2N and ORing that shifted value by the data value of the second source operand, squaring the temporary variable, ANDing the squared temporary variable with a ones complement of a value of ((1 left shifted by N) minus 1), wherein N is $\log_2$(base of the data value).

What is claimed is:

1. An apparatus comprising:
    decode logic to decode square-multiply (SQRMUL) instruction, the SQRMUL instruction including a first source operand, a second source operand, and a destination operand;
    execution logic to
        calculate a square of a data value of a first source operand,
        calculate a square of a data value of a second source operand,
        calculate a multiplication of the data of the first and second operands,
        wherein the calculations only use one multiplication operation; and
        store the results in the destination operand.

2. The apparatus of claim 1, wherein the destination operand is a general-purpose register.

3. The apparatus of claim 1, the square of a data value of a first source operand is stored in lower order bits of the destination operand, the square of a data value of a second source operand is stored in higher order bits of the destination operand, and the multiplication of the data of the first and second operands is stored in middle order bits of the destination operand.

4. The apparatus of claim 1, wherein the destination operand is a packed data register and each of the three calculations is stored in a different data element of the packed data register.

5. The apparatus of claim 1, wherein the execution logic to calculate the square of the data value of the first source operand by,
    generating a temporary variable by left shifting the data value of the first source operand by 2N and ORing that shifted value by the data value of the second source operand,
    squaring the temporary variable, and
    right shifting the temporary variable by 4N bits, wherein N is $\log_2$(base of the data value).

6. The apparatus of claim 1, wherein the execution logic to calculate the multiplication of the data value of the first source and second source operand by,
    generating a temporary variable by left shifting the data value of the first source operand by 2N and ORing that shifted value by the data value of the second source operand,
    squaring the temporary variable,
    ANDing the squared temporary variable with a value of ((2 left shifted by $2^N$) minus 1, and
    right shifting by 2N plus 1, wherein N is $\log_2$(base of the data value).

7. The apparatus of claim 1, wherein the execution logic to calculate the square of the data value of the second source operand by,
    generating a temporary variable by left shifting the data value of the first source operand by 2N and ORing that shifted value by the data value of the second source operand,
    squaring the temporary variable,
    ANDing the squared temporary variable with a ones complement of a value of ((1 left shifted by N) minus 1), wherein N is $\log_2$(base of the data value).

8. A method of performing in a computer processor a square-multiply (SQRMUL) instruction, the SQRMUL instruction including a first source operand, a second source operand, and a destination operand, the method comprising:
    calculating a square of a data value of a first source operand,
    calculating a square of a data value of a second source operand,
    calculating a multiplication of the data of the first and second operands,
    wherein the calculations only use one multiplication operation; and
    storing the results in the destination operand.

9. The method of claim 8, wherein the destination operand is a general-purpose register.

10. The method of claim 8, the square of a data value of a first source operand is stored in lower order bits of the destination operand, the square of a data value of a second source operand is stored in higher order bits of the destination operand, and the multiplication of the data of the first and second operands is stored in middle order bits of the destination operand.

11. The method of claim 8, wherein the destination operand is a packed data register and each of the three calculations is stored in a different data element of the packed data register.

12. The method of claim 8, wherein calculating the square of the data value of the first source operand comprises:
generating a temporary variable by left shifting the data value of the first source operand by 2N and ORing that shifted value by the data value of the second source operand,
squaring the temporary variable, and
right shifting the temporary variable by 4N bits, wherein N is $\log_2$(base of the data value).

13. The method of claim 8, calculating the multiplication of the data value of the first source and second source operand comprises:
generating a temporary variable by left shifting the data value of the first source operand by 2N and ORing that shifted value by the data value of the second source operand,
squaring the temporary variable,
ANDing the squared temporary variable with a value of ((1 left shifted by $2^N$) minus 1, and
right shifting by 2N plus 1, wherein N is $\log_2$(base of the data value).

14. The method of claim 8, wherein calculating the square of the data value of the second source operand comprises:
generating a temporary variable by left shifting the data value of the first source operand by 2N and ORing that shifted value by the data value of the second source operand,
squaring the temporary variable,
ANDing the squared temporary variable with a ones complement of a value of ((2 left shifted by N) minus 1), wherein N is $\log_2$(base of the data value).

15. A tangible machine-readable medium including code which when executed by a processor causes the processor to execute a method to perform a square-multiply (SQRMUL) instruction, the SQRMUL instruction including a first source operand, a second source operand, and a destination operand, the method comprising:
calculating a square of a data value of a first source operand,
calculating a square of a data value of a second source operand,
calculating a multiplication of the data of the first and second operands,
wherein the calculations only use one multiplication operation; and
storing the results in the destination operand.

16. The method of claim 15, wherein the destination operand is a general-purpose register.

17. The method of claim 15, the square of a data value of a first source operand is stored in lower order bits of the destination operand, the square of a data value of a second source operand is stored in higher order bits of the destination operand, and the multiplication of the data of the first and second operands is stored in middle order bits of the destination operand.

18. The method of claim 15, wherein calculating the square of the data value of the first source operand comprises:
generating a temporary variable by left shifting the data value of the first source operand by 2N and ORing that shifted value by the data value of the second source operand,
squaring the temporary variable, and
right shifting the temporary variable by 4N bits, wherein N is $\log_2$(base of the data value).

19. The method of claim 15, calculating the multiplication of the data value of the first source and second source operand comprises:
generating a temporary variable by left shifting the data value of the first source operand by 2N and ORing that shifted value by the data value of the second source operand,
squaring the temporary variable,
ANDing the squared temporary variable with a value of ((1 left shifted by $2^N$) minus 1, and
right shifting by 2N plus 1, wherein N is $\log_2$(base of the data value).

20. The method of claim 15, wherein calculating the square of the data value of the second source operand comprises:
generating a temporary variable by left shifting the data value of the first source operand by 2N and ORing that shifted value by the data value of the second source operand,
squaring the temporary variable,
ANDing the squared temporary variable with a ones complement of a value of ((2 left shifted by N) minus 1), wherein N is $\log_2$(base of the data value).

* * * * *